(12) United States Patent
Suzuki et al.

(10) Patent No.: US 8,857,276 B2
(45) Date of Patent: Oct. 14, 2014

(54) PRESSURE DETECTION UNIT

(75) Inventors: Takahiro Suzuki, Kyoto (JP); Yuko Endo, Kyoto (JP); Yoshihiro Kai, Nagaokakyo (JP); Yuichiro Takai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 244 days.

(21) Appl. No.: 13/392,621

(22) PCT Filed: Aug. 26, 2010

(86) PCT No.: PCT/JP2010/064498
§ 371 (c)(1),
(2), (4) Date: May 7, 2012

(87) PCT Pub. No.: WO2011/024903
PCT Pub. Date: Mar. 3, 2011

(65) Prior Publication Data
US 2012/0204657 A1    Aug. 16, 2012

(30) Foreign Application Priority Data
Aug. 28, 2009   (JP) ................. 2009-198705

(51) Int. Cl.
*G01L 1/18* (2006.01)
*G01L 1/20* (2006.01)
*G06F 3/041* (2006.01)

(52) U.S. Cl.
CPC .. *G01L 1/20* (2013.01); *G06F 3/041* (2013.01)
USPC ...................................... 73/862.68

(58) Field of Classification Search
USPC ........................................ 73/862.627, 862.68
See application file for complete search history.

(56) References Cited

U.S. PATENT DOCUMENTS

| 4,644,801 | A | * | 2/1987 | Kustanovich | 73/862.046 |
| 4,794,366 | A | * | 12/1988 | Sakamoto | 338/114 |
| 5,583,303 | A | * | 12/1996 | Franz | 73/862.046 |
| 6,234,031 | B1 | * | 5/2001 | Suga | 73/862.474 |
| 6,373,373 | B1 | * | 4/2002 | Saito | 338/47 |
| 7,068,142 | B2 | * | 6/2006 | Watanabe et al. | 338/47 |
| 7,112,755 | B2 | * | 9/2006 | Kitano et al. | 200/511 |
| 8,094,134 | B2 | * | 1/2012 | Suzuki et al. | 345/173 |
| 8,294,674 | B2 | * | 10/2012 | Yu | 345/173 |
| 8,314,536 | B2 | * | 11/2012 | Ito et al. | 310/365 |
| 8,635,919 | B2 | * | 1/2014 | Suzuki et al. | 73/862.627 |
| 2002/0056918 | A1 | | 5/2002 | Saito | |

(Continued)

FOREIGN PATENT DOCUMENTS

| JP | 57110436 U | 7/1982 |
| JP | 61207939 A | 9/1986 |
| JP | 2000241268 A | 9/2000 |
| JP | 2000275115 A | 10/2000 |
| JP | 2000321151 A | 11/2000 |
| JP | 2001165788 A | 6/2001 |
| JP | 200248658 A | 2/2002 |
| JP | 2002124404 A | 4/2002 |
| JP | 200428883 A | 1/2004 |
| JP | 2006317340 A | 11/2006 |
| JP | 200710383 A | 1/2007 |
| JP | 200846817 A | 2/2008 |
| JP | 2008122215 A | 5/2008 |
| JP | 200931045 A | 2/2009 |
| JP | 2009134473 A | 6/2009 |
| WO | 2010074116 A1 | 7/2010 |

*Primary Examiner* — Freddie Kirkland, III
(74) *Attorney, Agent, or Firm* — The Webb Law Firm (57) ABSTRACT

A pressure detection unit includes a first substrate and a second substrate which are disposed in opposition to each other and subject to load from the outside, a pressure detection portion having a pair of electrodes provided between the first substrate and the second substrate and in the first substrate and the second substrate, and electrically conductive pressure-sensitive ink disposed between the pair of electrodes and having electrical characteristics which varies according to the load, and a load transmission member disposed between the first substrate and the pressure detection portion and/or between the second substrate and the pressure detection portion, the load transmission member transmitting the load to the pressure detection portion in a concentrated manner.

15 Claims, 7 Drawing Sheets

(56) References Cited

U.S. PATENT DOCUMENTS

| | | |
|---|---|---|
| 2004/0000195 A1 | 1/2004 | Yanai et al. |
| 2009/0140996 A1 | 6/2009 | Takashima et al. |
| 2009/0289529 A1 | 11/2009 | Ito et al. |
| 2011/0115738 A1 | 5/2011 | Suzuki et al. |
| 2011/0198712 A1* | 8/2011 | Okumura et al. ............. 257/415 |
| 2012/0098767 A1* | 4/2012 | Takai et al. .................. 345/173 |
| 2012/0182249 A1* | 7/2012 | Endo et al. .................... 345/173 |
| 2013/0169589 A1* | 7/2013 | Suzuki et al. ................ 345/174 |
| 2013/0201150 A1* | 8/2013 | Suzuki et al. ................ 345/174 |

* cited by examiner

PRESSURE DETECTION UNIT

BACKGROUND OF THE INVENTION

1. Field of the Invention

The present invention relates to a pressure detection unit for use in e.g. an information input device that allows information input by a user's pressing on a panel member.

2. Description of Related Art

Conventionally, a pressure-sensitive sensor is known as a device having a press detection function for detecting a pressing force (see Patent Document 1). The pressure-sensitive sensor disclosed in Patent Document 1 comprises plastic films facing and bonded to each other via an insulating layer having adhesion layers on the front and back faces thereof, each plastic film including an electrode and a pressure-sensitive ink layer laid one on the other.

Figure 14:
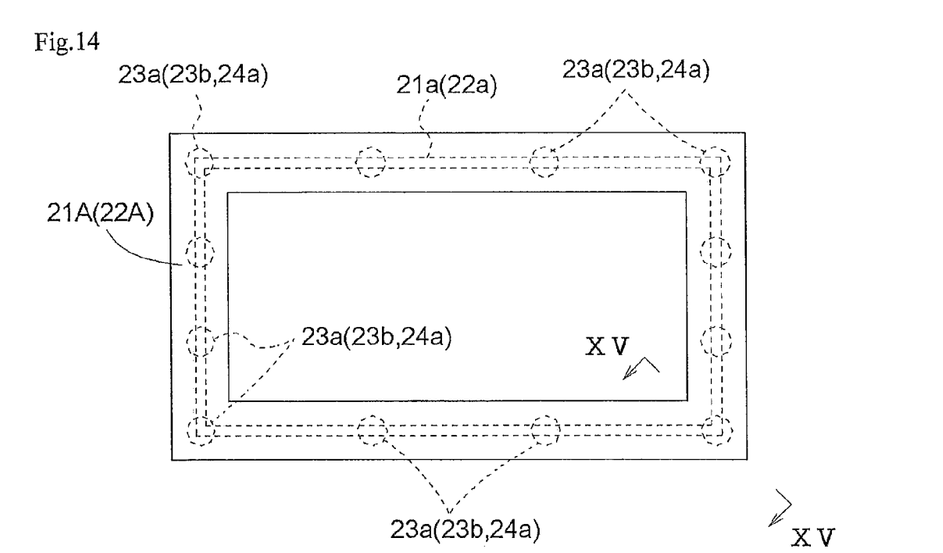
FIG. 14 is a view showing a conventional pressure detection unit.

Further, the present applicant filed a patent application for an arrangement configured for restricting reduction in visibility of a displaying portion when the pressure-sensitive sensor of Patent Document 1 is to be used in a touch panel from which visibility is required (Japanese Patent Application No. 2008-330288, WO 2010/074116). The pressure-sensitive sensor for a touch panel disclosed in Japanese Patent Application No. 2008-330288 (WO 2010/074116) has a same arrangement for its vertically stacked portion as the arrangement disclosed in Patent Document 1. In addition, as shown in FIG. 14, a pair of electrodes 21a, 22a are disposed in the form of frames along edges of plastic films 21A, 22A and pressure-sensitive ink 23a, 23b are provided in the form of spots distributed along the edge portions of the plastic films 21A, 22A. Incidentally, in an adhesion layer 30, an insulation member 30A is disposed between two layers of adhesion material 30B so as to avoid formation of electric conduction between the electrode 21a and the electrode 22a.

Figure 15:
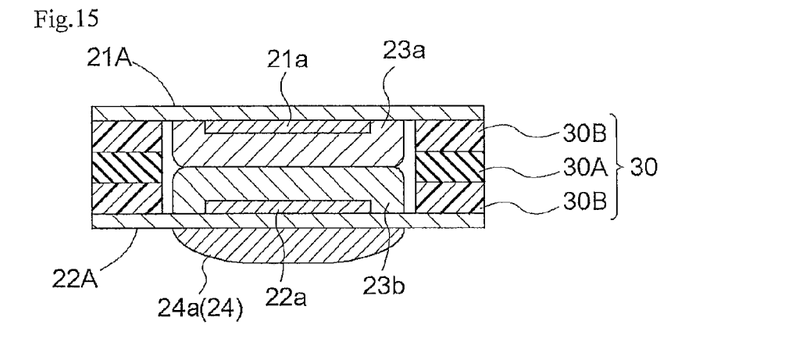
FIG. 15 is a section view taken along XV-XV line in FIG. 14.

In the above, the pressure-sensitive sensor, as shown in FIG. 15, includes a bump 24a as a load transmission member 24 on the outer face of the plastic film 22A. With this arrangement, when a pressing force is applied to the pressure-sensitive sensor along the thickness direction, the portion of the plastic film 22A corresponding to the pressure-sensitive ink 23b is supported from under, so that the applied pressing force can be transmitted in a reliable manner without dispersion thereof as a force to be utilized for deformation of the plastic film 22A.

Patent Document 1: Japanese Unexamined Patent Application Publication 2002-48658

SUMMARY OF THE INVENTION

In the case of the pressure-sensitive sensor shown in FIG. 15, in case the bump 24a is provided on the outer face of the plastic film 22A, there may occur inconvenience that this bump 24a may be removed as result of its frictional contact with an external member during use of the pressure-sensitive sensor. Further, as the bump 24a is provided on the outer face of the plastic film, this requires a step of forming a pressure detection portion between the plastic films 21A, 22A and a step of forming the bump 24a on the outer face of the plastic film 22A, which steps need to be effected separately. As a result, the manufacture of the pressure-sensitive sensor was troublesome.

Then, the object of the present invention is to provide a pressure-sensitive unit having a load transmission member that can function in a stable manner for a long time.

According to the first characterizing feature of a pressure detection unit relating to the present invention, the pressure detection unit comprises: a first substrate and a second substrate are disposed in opposition to each other and subject to load from the outside; a pressure detection portion having a pair of electrodes provided between the first substrate and the second substrate and in the first substrate and the second substrate, and electrically conductive pressure-sensitive ink disposed between the pair of electrodes and having electrical characteristics which varies according to the load; and a load transmission member disposed between the first substrate and the pressure detection portion and/or between the second substrate and the pressure detection portion, the load transmission member transmitting the load to the pressure detection portion in a concentrated manner.

Since a load transmission member is provided disposed between the first substrate and the pressure detection portion and/or between the second substrate and the pressure detection portion, no substrate is present between the load transmission member and the pressure detection portion, unlike the case of providing the load transmission member on the outer face of a substrate of the pressure detection unit. That is, when a load from the outside is applied to the pressure detection unit, the load transmission member directly supports the pressure detection portion to receive this load in a concentrated manner without dispersion thereof, so that this load is transmitted reliably to the pressure-sensitive ink. As the load transmission member directly supports the pressure detection portion, in comparison with the arrangement of providing the load transmission member on the outer face of the substrate of the pressure detection portion, the pressure detection portion will be pressed more reliably. With this, the measurement accuracy of the pressure detection portion can be improved.

Further, as being disposed between the first substrate and the pressure detection portion and/or between the second substrate and the pressure detection portion, the load transmission member is not exposed to the outside of the pressure detection unit. That is, as the load transmission member is disposed with being protected from the external member by the substrate(s), there will occur no inadvertent removal of the load transmission member as a result of frictional contact thereof with the external member. In this way, the durability of the load transmission member of the pressure detection unit can be improved consequently.

Further, as the pressure detection portion and the load transmission member are disposed at the opposing area between the first substrate and the second substrate, the load transmission member, the electrode and the pressure-sensitive ink are to be disposed one after another on the substrate. That is, since one side substrate portion of the pressure detection unit is manufactured by a series of steps, positional error will hardly occur in the respective layers of the load transmission member, the electrode and the pressure-sensitive ink on the substrate. Further, since the manufacturing process is simplified as there is no need to separately form the load transmission member on the outer face of the substrate of the pressure detection unit, the production efficiency of the pressure detection unit having the load transmission member can be improved consequently.

According to the second characterizing feature of the pressure detection unit relating to the present invention, the thickness of the first substrate and the thickness of the second substrate are rendered different from each other.

With the above-described construction, in case e.g. the first substrate and the second substrate are formed of a same material, one of the first and second substrate having the smaller thickness will be deformed more easily than the other. Then, with deforming the thinner substrate for readily forming convex the shape of the thinner substrate side of the pressure detection unit, the contact area between the pressure detection unit and the external member can be reduced. With this reduction in the contact area between the pressure detection unit and the external member, load from the outside will be transmitted in a concentrated manner to the pressure-sensitive ink of the pressure detection unit. As a result, the pressing force determination accuracy of the pressure detection unit can be enhanced.

According to the third characterizing feature of the pressure detection unit relating to the present invention, the load transmission member is provided between the first substrate and the pressure detection portion as well as between the second substrate and the pressure detection portion.

With the above-described construction, the load transmission member is provided both of the first substrate side and the second substrate side, whereby a pressing force from the outside can be transmitted even more reliably by the upper and lower load transmission members.

According to the fourth characterizing feature of the pressure detection unit relating to the present invention, the load transmission member is formed with its cross sectional area progressively increased as it extends away from the inner face of the first substrate or the second substrate.

With the above-described construction, even when e.g. the peripheral edge portion of a panel member is warped or flexed upwards during a pressing operation of this panel member, it is possible to restrict change (decrease) of the contact area between the load transmission member and the external member (e.g. the panel member or the like). That is, the load transmission member will allow a certain amount of posture change between the pressure detecting portion having the electrodes and the pressure-sensitive ink and the external member which presses this pressure detection portion. Therefore, when posture change between the pressure detecting portion and the external member is small, the load transmission member restricts dispersion of the load applied from the outside to the other portion than the pressure detecting portion.

According to the fifth characterizing feature of the pressure detection unit relating to the present invention, the pressure-sensitive ink is provided in the form of dots along the peripheral edge portion of the first substrate or the second substrate.

With the above-described construction, the pressure-sensitive ink is provided only at those positions where the pressure-sensitive ink receives a load from the outside, so that the pressure-sensitive ink will not be provided on the substrate of the pressure detection unit more than necessary.

According to the sixth characterizing feature of the pressure detection unit relating to the present invention, the pressure-sensitive ink is disposed so as to cover at least one of the pair of electrodes.

With the above-described construction, between the pair of electrodes that are arranged between the first substrate and the second substrate, the electrically conductive pressure-sensitive ink is present so as to cover at least one of the pair of electrodes. Hence, need for an intermediate layer (insulation layer) of the adhesion member is eliminated. As a result, with reduction of the thickness of the adhesion member, the pressure detection unit as a whole can be formed thinner.

According to the seventh characterizing feature of the pressure detection unit relating to the present invention, the pair of electrodes are disposed on one of the first substrate and the second substrate and the pressure-sensitive ink is disposed on the other one of the first substrate and the second substrate so as to cover the pair of electrodes.

With the above-described construction, the electrode layer is formed as a single layer, so that the thickness of the pressure detection portion is reduced, and as a result, the pressure detection unit can be formed thinner. In this case, if the pair of electrodes are provided in the form of comb or coil to control their contact area with the pressure-sensitive ink, it becomes possible to obtain signals from a desired detection range.

According to the eighth characterizing feature of the pressure detection unit relating to the present invention, the pressure detection unit further comprises an adhesion member disposed in the opposing area of the first substrate and the second substrate and having adhesiveness for adhering the first substrate and the second substrate to each other, with the pair of electrodes and the pressure-sensitive ink being in contact with each other, the adhesion member drawing the first substrate and the second substrate to each other, thereby to apply an initial load to the pressure-sensitive ink.

Since the adhesion member draws the first substrate and the second substrate to each other, thereby to apply a load (a preload) to the pressure-sensitive ink in advance, an unstable detection value obtained at the initial stage can be eliminated automatically. Hence, this will also serve to minimize the range of error for the detection values (resistance values) for loads. Therefore, even when the pressure detection unit is to detect a pressing force of light load, the detection accuracy of the pressing force is improved. As a result, the pressing force determination accuracy can be improved.

According to the ninth characterizing feature of the pressure detection unit relating to the present invention, the first substrate and the second substrate are fused to each other with the pair of electrodes and the pressure-sensitive ink being in contact with each other, thereby to draw the first substrate and the second substrate to each other to apply an initial load to the pressure-sensitive ink.

As the first substrate and the second substrate are fused to each other, the first substrate and the second substrate are drawn to each other to apply a load (a preload) to the pressure-sensitive ink in advance. Therefore, an unstable detection value obtained at the initial stage can be eliminated automatically. Hence, even when the pressure detection unit is to detect a pressing force of light load, the detection accuracy of the pressing force is improved. Further, as there is no need to provide an adhesion member between the first substrate and the second substrate, the construction of the pressure detection unit per se can be simplified.

DESCRIPTION OF THE PREFERRED EMBODIMENTS

Next, embodiments of a pressure detection unit relating to the present invention will be explained with reference to the accompanying drawings.

Embodiment 1

Figure 1:
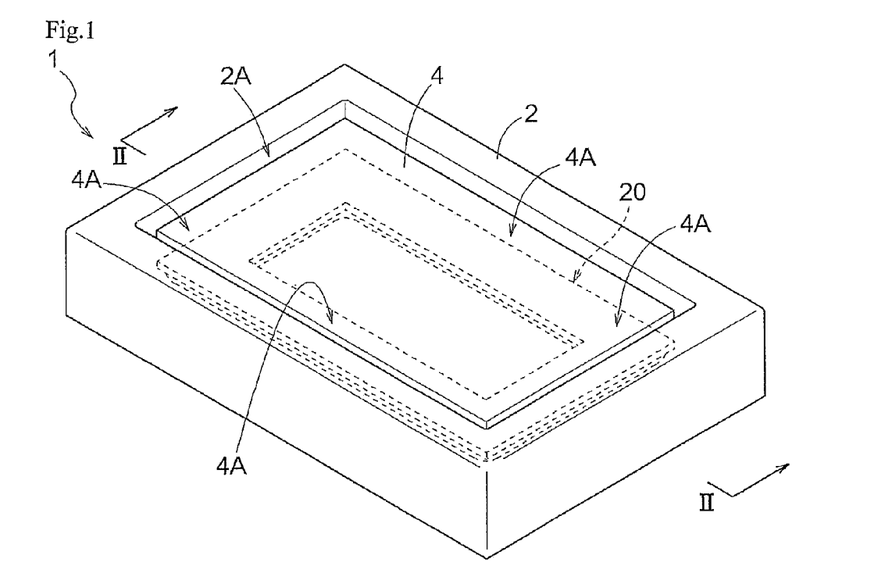
FIG. 1 is a perspective view of an information input device mounting a pressure detection unit relating to the present invention.

First, the construction of an information input device 1 mounting a pressure detection unit 20 relating to the present invention will be explained with reference to FIGS. 1 through 7. As shown in FIG. 1, the information input device 1 includes a housing body 2 forming an opening portion 2A or the like in its front face, a panel member 4 having a touch-type information input function, and a pressure detecting means including a pressure detection unit 20 for detecting a pressing operational force to the panel member 4.

Figure 2:
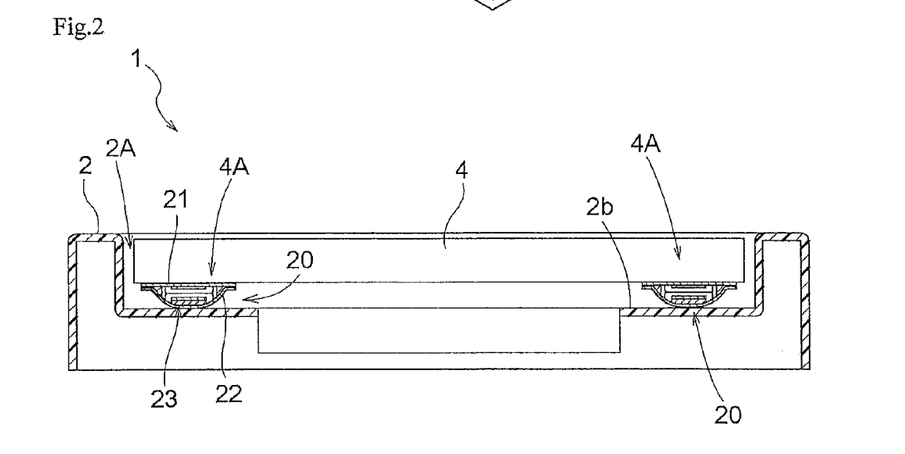
FIG. 2 is a section view taken along II-II line in FIG. 1.
Figure 4:
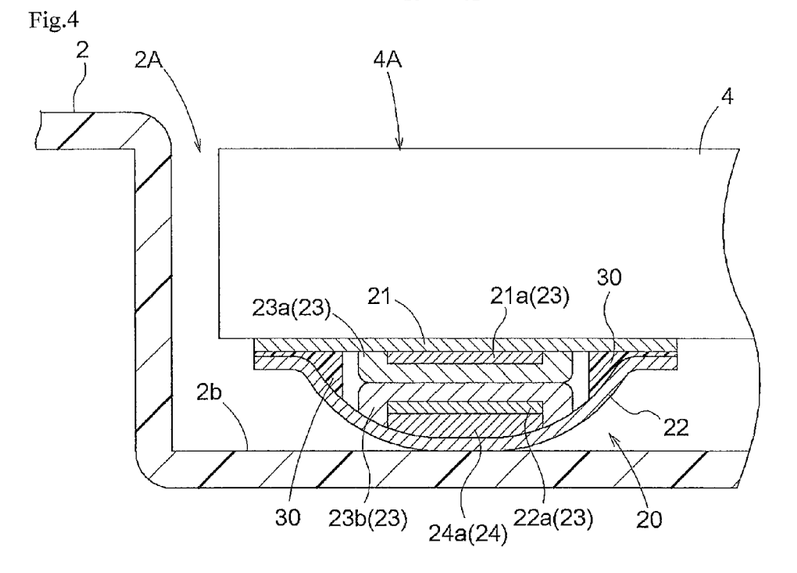
FIG. 4 is a section view taken along line in FIG. 3.

The pressure detecting means, as shown in FIG. 2 and FIG. 4, is comprised of the pressure detection unit 20 provided between and across the panel member 4 and a support portion 2b of the housing body 2, an unillustrated signal processing circuit for processing output signals from the pressure detection unit 20, and so on. As the panel member 4, if such a member having the so-called touch input function for detecting a user's touch operation on the panel member 4 through detection of the X-Y coordinates of this operated position is employed, pressure detection and the X-Y coordinates detection can both be effected by the pressure detection unit alone, so that the convenience of the device will be enhanced. As the device having the touch input function, it can be selected from the resistive film type, the electrostatic capacitance type, and the electromagnetic induction type, etc.

Figure 3:
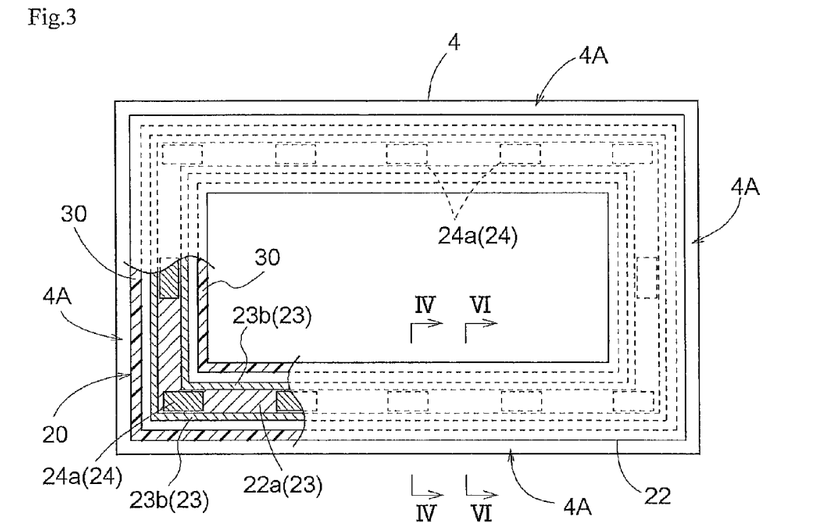
FIG. 3 is a view showing layout of the inventive pressure detection unit in the information input device.
Figure 5:
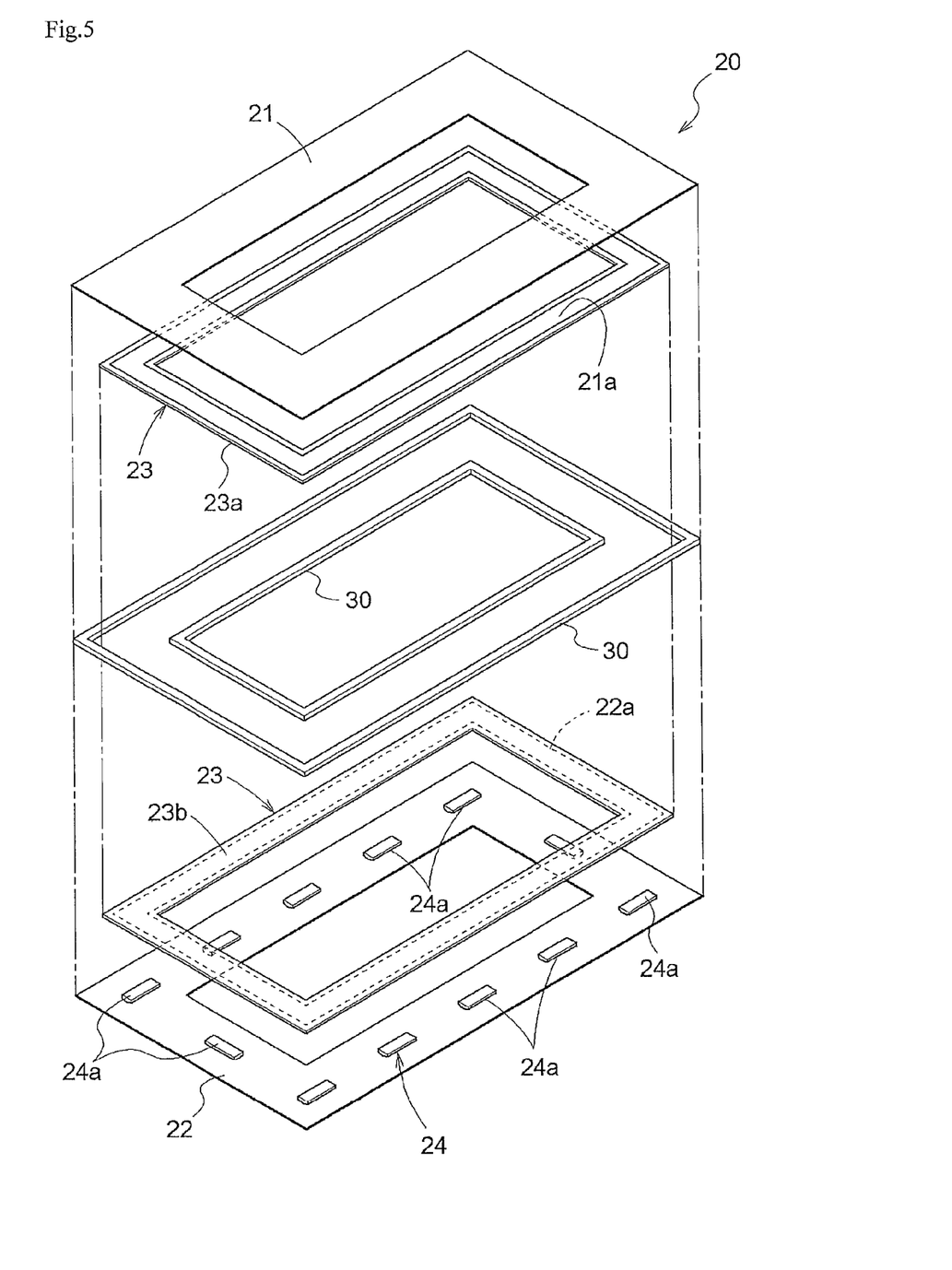
FIG. 5 is an exploded perspective view of the pressure detection unit relating to the present invention.
Figure 6:
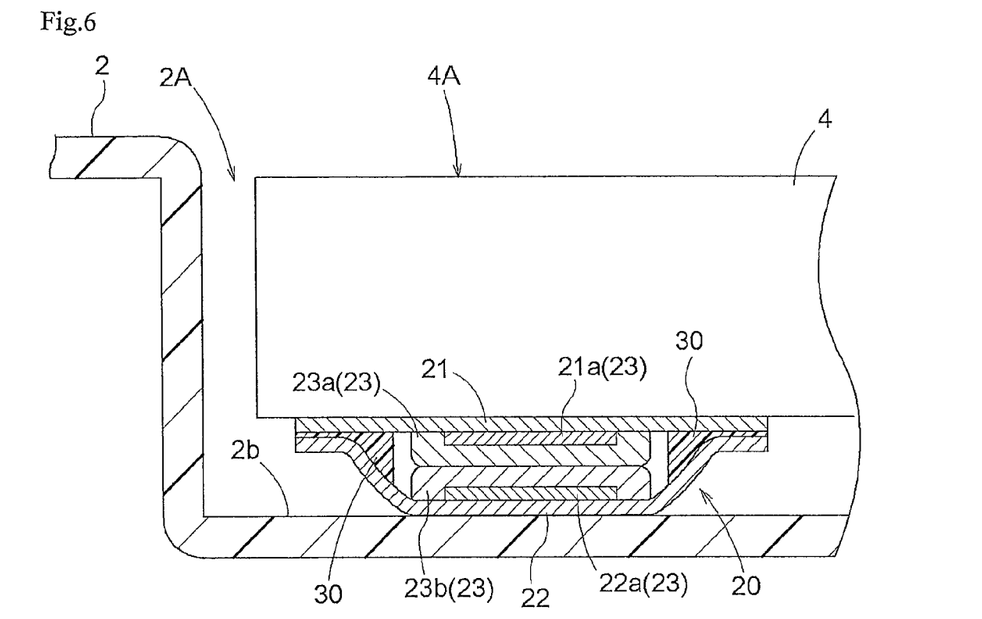
FIG. 6 is a section view taken along VI-VI line in FIG. 3.

Next, the construction of the pressure detection unit 20 will be explained. FIG. 3 is a view showing layout of the pressure detection unit 20 in the information input device 1. FIG. 4 is a section view taken along IV-IV line in FIG. 3. FIG. 5 is an exploded perspective view of the pressure detection unit 20. FIG. 6 is a section view taken along VI-VI line in FIG. 3.

The pressure detection unit 20 used in the information input device 1 includes frame-like first and second substrates 21, 22 which are disposed in opposition to each other to receive a load from the outside. The inside dimensions of the frame-like first substrate 21 and the frame-like second substrate 22 are set to match the dimensions of the opening portion 2A and the outside dimensions thereof are set to match an X-Y coordinates detection device (not shown) separately provided. On the face of the first substrate 21 in opposition to (i.e. facing) the second substrate 22, there is disposed an upper electrode 21a in the form of frame. On the face of the second substrate 22 in opposition to (i.e. facing) the first substrate 21, there is disposed a lower electrode 22a in the form of frame in opposition to the upper electrode 21a.

On the first substrate 21, there is mounted a frame-like upper pressure-sensitive ink 23a so as to cover the upper electrode 21a. Similarly, for the second substrate 22 too, on this second substrate 22, there is mounted a frame-like lower pressure-sensitive ink 23b so as to cover the lower electrode 22a and also in opposition to the upper pressure-sensitive ink 23a. Incidentally, it will suffice for the pressure-sensitive ink 23a, 23b to cover at least one of the pair of electrodes 21a, 22a. The width of the pressure-sensitive ink 23a, 23b disposed in the form of frame is greater than the width of the pair of electrodes 21a, 22a disposed similarly in the form of frame. However, as long as an arrangement is provided for avoiding direct contact between the electrode 21a and the electrode 22a, the widths of the electrodes 21a, 22a and the pressure-sensitive ink 23a, 23b may be same.

That is, a pressure detection portion 23 includes the upper electrode 21a formed on the first substrate 21, the lower electrode 22a formed on the second substrate 22 in opposition to the upper electrode 21a, the upper pressure-sensitive ink 23a covering the upper electrode 21a and the lower pressure-sensitive ink 23b in opposition to the upper pressure-sensitive ink 23a to cover the lower electrode 22a.

As shown in FIG. 3 and FIG. 4, between the second substrate 22 and the lower electrode 22a, there are disposed a plurality of bumps 24a as a load transmission member 24. The mounting (disposing) area of the bumps 24a is set to be smaller than the disposing area of the electrode 22a. As some exemplary specific constructions of the bump 24a, this can be formed by applying or printing a heat curable resin or UV curable resin and curing it, or can be a sheet of film or resin plate cut in dimensions to suit the pressure detection portion and affixed thereto, or can be a foam material such as PE foam, urethane foam, etc. The height size of the bump 24a is set as e.g. from 50 μm to 200 μm (including the thickness of the adhesion layer for adhesion to the second substrate 22).

As the pressure detection portion 23 and the bumps 24a are disposed at the opposing area between the first substrate 21 and the second substrate 22, in manufacturing the pressure detection unit 20, the bumps 24a, the lower electrode 22a and the lower pressure-sensitive ink 23b are to be disposed one after another on the second substrate 22, with using a printing process for example. That is, since one side substrate portion of the pressure detection unit 20 is manufactured by a series of steps, positional error will hardly occur in the respective layers of the bumps 24a, the lower electrode 22a and the lower pressure-sensitive ink 23b on the second substrate 22. Further, since the manufacturing process is simplified as there is no need to separately form the load transmission member on the outer face of the substrate of the pressure detection unit 20. Therefore, the production efficiency of the pressure detection unit 20 having the load transmission member 24 can be improved.

In the area where the first substrate 21 and the second substrate 22 oppose to each other and along the peripheral edge of the pressure detection portion 23, an adhesion member 30 is disposed. The adhesion member 30 is bound between the first substrate 21 and the second substrate 22 and draws these first and second substrates 21, 22 to each other and urges them toward the pressure-sensitive 23a, 23b thereby to apply an initial load thereto. The adhesion member 30 comprises e.g. a non-elastic spacer (including layers for adhesion to the substrates 21, 22 or can be an amount of adhesive agent alone) whose thickness is rendered smaller than that of the pressure detection portion 23. In case deformation of the first substrate 21 or the second substrate 22 is allowed, the first substrate 21 or the second substrate 22 will further compress the pressure-sensitive ink 23a, 23b applied with the initial load, for detection of a pressing force. Alternatively, the adhesion member 30 can comprise an adhesive agent or a double-sided adhesion member having elasticity or can be various kinds of elastic member (including the layers for adhesion to the substrates 21, 22) such as rubber, a torsion coil spring, a plate spring, etc which is disposed under such condition to exert a tensile force. Incidentally, in FIG. 4 and FIG. 6, the pressure detection portion 23 and the adhesion member 30 are shown to be spaced from each other. However, the pressure detection portion 23 and the adhesion member 30 can partially contact each other.

In the above, the adhesion member 30 is configured to have a thickness under its free state smaller than the thickness of the pressure detection portion 23. This arrangement will apply a force to the adhesion member 30 disposed which force causes the member 30 to retain its initial thickness. And, this force will act to draw the first substrate 21 and the second substrate 22 closer to each other. In this way, by reducing the distance between the first substrate 21 and the second substrate 22 and reducing the thickness of the pressure detection portion 23 under its non-pressurized state, initial load is applied to the pressure-sensitive ink 23*a*, 23*b* as a result thereof.

Next, the operation of the pressure detection unit 20 mounted in the information input device 1 will be explained. Inside the information input device 1, the upper electrode 21*a* and the lower electrode 22*a* are connected to a connector (not shown) which is connected in turn to a load detection portion (not shown) incorporated within the information input device.

Change is detected in the resistance applied to the upper pressure-sensitive ink 23*a* and the lower pressure-sensitive ink 23*b* of the pressure detection portion 23 of the pressure detection unit 20 when the panel member 4 is pressed. With this detection of resistance change, an external force applied to the pressure-sensitive ink 23*a*, 23*b* can be detected and the load to the panel member 4 can be detected.

In the above, since the pressure detection unit 20 is provided with the adhesion member 30 which draws the first substrate 21 and the second substrate 22 to each other, initial load is applied to the pressure-sensitive ink 23*a*, 23*b* prior to a pressing operation of the panel member 4. With this, the load range from the zero-load to stable detection load where there is significant irregularity in detection values (resistance values) is cancelled out. Therefore, at the time of subsequent pressing operation on the panel member 4, a value detected by the pressure detection portion 23 can be used directly for controlling information input.

Figure 7:
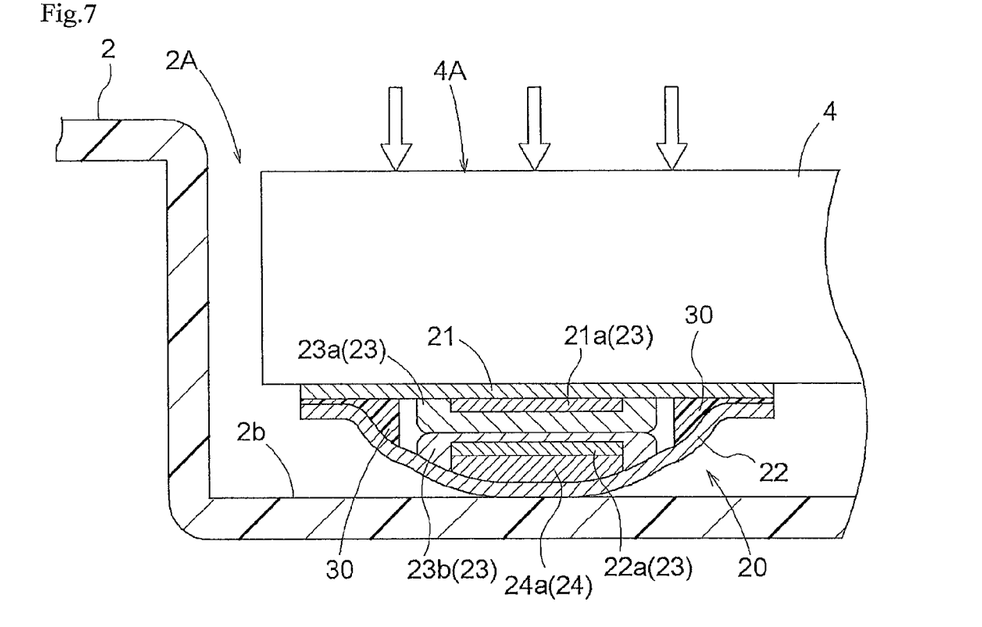
FIG. 7 is a view illustrating operational condition of the pressure detection unit.

Further, as the bumps 24*a* are provided between the second substrate 22 and the pressure detection portion 23, i.e. between the second substrate 22 an the electrode 22*a*, when a load is applied from the outside to the pressure detection portion 23, the bumps 24*a* support the lower pressure-sensitive ink 23*b* from under, thus transmitting this load to the lower pressure-sensitive ink 23*b* in a concentrated manner (FIG. 7). As a result, the upper pressure-sensitive ink 23*a* and the lower pressure-sensitive ink 23*b* are pressed against each other in a reliable manner, so that the pressing force determination accuracy of the pressure detection unit 20 can be improved. Further, as the bumps 24*a* are not exposed on the outer face of the second substrate 22, there occurs no inadvertent removal of bumps 24*a* from the pressure detection unit 20 as a result of frictional contact with an external member.

The first substrate 21 and the second substrate 22 can be e.g. films or the like and the material thereof can be a general-purpose resin such as polyethylene terephthalate, polystyrene-based resin, polyolefin-based resin, ABS resin, AS resin, acryl-based resin, AN resin, or a general-purpose engineering resin such as polystyrene-based resin, polycarbonate-based resin, polyacetal-based resin, polycarbonate modified polyphenylene ether resin, polybutylene terephthalate resin, ultrahigh molecular weight polyethylene resin, or a super-engineering resin such as polysulphone resin, polyphenylene sulfide based resin, polyphenylene oxide based resin, polyarylate resin, polyetherimide resin, polyimide resin, liquid crystal polyester resin, polyallyl based heat resistant resin.

The material for forming the upper electrode 21*a* and the lower electrode 22*a* can be a metal such as gold, silver, copper, nickel, or a conductive paste of carbon etc. The method of forming these can be a printing method such as screen printing, offset printing, gravure printing, flexo printing, or a photoresist technique. Further alternatively, the upper electrode 21*a* and the lower electrode 22*a* can be formed by affixing a metal foil of copper, gold or the like. Further alternatively, the upper electrode 21*a* and the lower electrode 22*a* can be formed by forming an electrode pattern by resist on an FPC plated with a metal such as copper and then etching the portion of the metal foil not protected by the resist. The electrodes can be formed by a method combining the above described forming methods or stacking (or laminating) the materials cited above.

The composition for forming the upper pressure-sensitive ink 23*a* and the lower pressure-sensitive ink 23*b* of the pressure detection portion 23 comprises a material whose electrical characteristics such as its electric resistance value varies according to an external force. As such composition, quantum tunneling composite (commercial name "QTC") manufactured by Peratech Limited of U.K. can be used. The upper pressure-sensitive ink 23*a* and the lower pressure-sensitive ink 23*b* can be mounted on the first substrate 21 and the second substrate 22 by applying technique. Such applying technique can be printing method such as screen printing, offset printing, gravure printing or flexo printing. The pressure-sensitive ink may be applied to only one face of the first substrate 21 and the second substrate 22.

The pressure detection unit 20 is affixed to the lower face of the peripheral edge portion 4A of the panel member 4 of the information input device 1 by means of an adhesive agent such as glue, or an adhesion layer such as a two-sided adhesion tape, etc. and is disposed in the form of frame so as to be hid by an ornamental portion of a peripheral edge portion 4A of the panel member 4. Therefore, the respective components constituting the pressure detection unit 20 can be formed of not only transparent material, but of colored material. Further, the pressure detection unit 20 can be disposed in the opening portion 2A with adhesively affixing the unit 20 on the support portion 2*b* with using the adhesion layer.

Embodiment 2

Preferably, as shown in FIG. 4, the bump 24*a* is formed in such manner that its cross sectional area progressively decreases as it extends away from the outer face of the second substrate 22 on which it is disposed. This arrangement allows a certain amount of posture change between the pressure-sensitive ink 23*a*, 23*b* and the external member (e.g. the panel member, etc.) which presses the pressure-sensitive ink 23*a*, 23*b*. Therefore, when posture change between the pressure-sensitive ink 23*a*, 23*b* and the external member is small, the bump 24*a* restricts dispersion of the load applied from the outside to the other portion than the pressure-sensitive ink 23*a*, 23*b*. Incidentally, the bump 24*a* can be either a non-elastic member or an elastic member.

Figure 8:
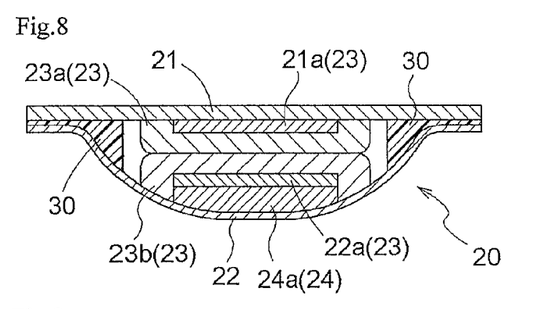
FIG. 8 is a view showing a pressure detection unit according to a further embodiment.

Other Embodiments (1) In the foregoing embodiment, the first substrate 21 and the second substrate 22 have a same thickness. Instead, the thickness of the first substrate 21 and the thickness of the second substrate 22 can be made different from each other. In FIG. 8, the thickness of the second substrate 22 is made smaller than the thickness of the first substrate 21. With this arrangement, the thinner second substrate 22 is more readily deformed than the first substrate 21, so that there can be readily formed a pressure detection unit 20 with the bumps 24*a* disposed between the first substrate 21 and the second substrate 22 being formed convex downwards. If the shape of the second substrate 22 side of the pressure detection unit 20 is formed convex, the contact area between the pressure detection unit 20 and the support portion 2*b* as an external member is reduced, so that a load from the support portion 2*b* will be transmitted in a concentrated manner to the pressure-sensitive ink 23*b* of the pressure detection unit 20. As a result, the pressing force determination accuracy of the pressure detection unit 20 can be enhanced.

Figure 9:
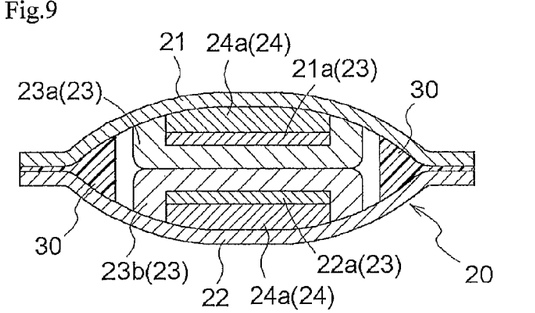
FIG. 9 is a view showing a pressure detection unit according to a further embodiment.

(2) In the foregoing embodiment, the load transmission member 24 is disposed only between the second substrate 22 and the pressure detection portion 23. Instead, the load transmission member 24 can be disposed between the first substrate 21 and the pressure detection portion 23. Further alternatively, as shown in FIG. 9, the load transmission members 24 can be disposed both between the first substrate 21 and the pressure detection portion 23 and between the second substrate 22 and the pressure detection portion 23. If the load transmission members 24 are disposed both the upper side and lower side of the pressure detection portion 23, these upper and lower load transmission members 24 allow the pressure detection portion 23 to be pressed even more reliably. Therefore, in comparison with the arrangement of the load transmission member 24 being provided only on either one of the upper and lower sides of the pressure detection portion 23, the determination accuracy of the pressure detection portion 23 can be enhanced.

Figure 10:
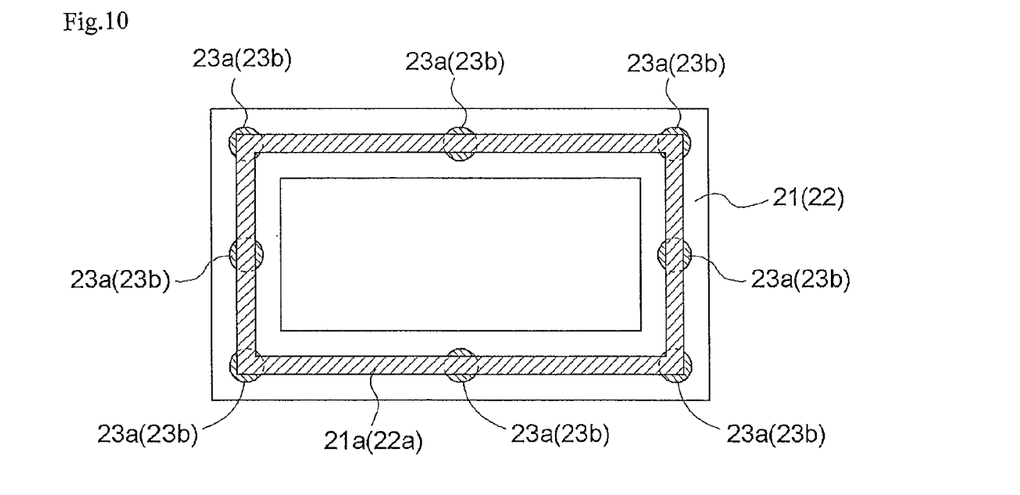
FIG. 10 is a view showing layouts of electrodes and pressure-sensitive ink in a pressure detection unit according to a further embodiment.

(3) In the foregoing embodiment, for the electrodes 21*a*, 22*a* disposed in the form of frame, the pressure-sensitive ink 23*a*, 23*b* too are disposed in the form of frame. Instead, as shown in FIG. 10, for the electrodes 21*a*, 22*a* disposed in the form of frame, the pressure-sensitive ink 23*a*, 23*b* can be disposed in the form of dots.

Figure 11:
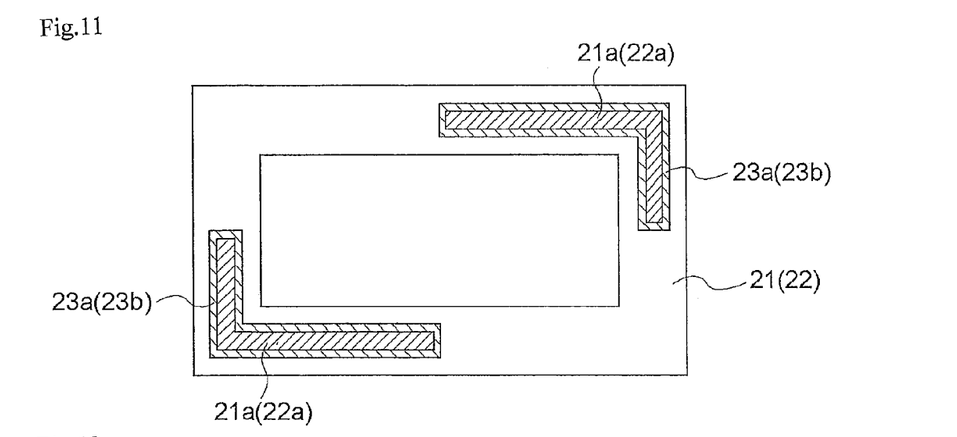
FIG. 11 is a view showing layouts of electrodes and pressure-sensitive ink in a pressure detection unit according to a further embodiment.

(4) In the foregoing embodiment, both the electrodes 21*a*, 22*a* and the pressure-sensitive ink 23*a*, 23*b* are disposed in the form of frames. Instead, as shown in FIG. 11, the electrodes 21*a*, 22*a* and the pressure-sensitive ink may be disposed partially and continuously in portions of the peripheral edge portion of the first substrate 21 or the second substrate 22.

Figure 12:
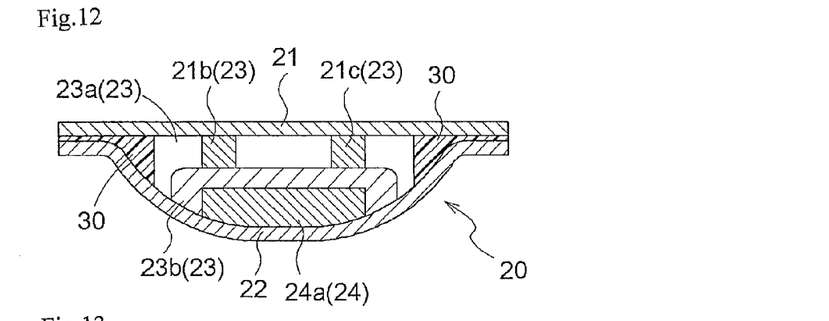
FIG. 12 is a view showing a pressure detection unit according to a further embodiment.

(5) In the foregoing embodiment, explanation was given with using the pressure detection portion 23 wherein the pair of electrodes 21*a*, 22*a* are disposed between the first substrate 21 and the second substrate 22 and the pressure-sensitive ink 23*a*, 23*b* are disposed between the pair of electrodes. Instead, the pressure detection portion 23, as shown in FIG. 12, can be configured such that the pair of electrodes 21*b*, 21*c* are disposed on either one of the first substrate 21 and the second substrate 22 and the pressure-sensitive ink 23*a*, 23*b* are disposed on the other one of the first substrate 21 and the second substrate 22 in such a manner to cover the pair of electrodes 21*b*, 21*c*. With this arrangement, the electrode layer is formed as a single layer, thus further reducing the thickness of the pressure detection portion 23. As a result, it becomes possible to reduce the thickness of the pressure detection unit 20. In this case, if the pair of electrodes 21*b*, 21*c* are provided in the form of comb or coil to control their contact area with the pressure-sensitive ink, it becomes possible to obtain signals from a desired detection range.

Figure 13:
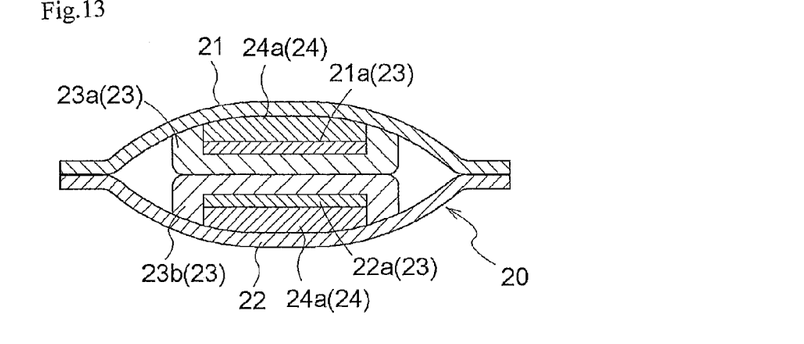
FIG. 13 is a view showing a pressure detection unit according to a further embodiment.

(6) In the foregoing embodiment, the adhesion member is disposed between the first substrate 21 and the second substrate 22 thereby to apply an initial load to the pressure-sensitive ink 23*a*, 23*b*. Instead, as shown in FIG. 13, the first substrate 21 and the second substrate 22 may be fused to each other with the pair of electrodes 21*a*, 22*a* being in contact with the pressure-sensitive ink 23*a*, 23*b*, thereby to apply initial load to the pressure-sensitive ink 23*a*, 23*b*.

INDUSTRIAL APPLICABILITY

The pressure detection unit relating to the present invention is useful for use in an electronic device such as a mobile phone, a smart phone, a PDA, a car navigation device, a digital camera, a digital video camera, a game machine, a tablet PC, etc. And, the unit and the device can be effectively utilized for achieving multi-functionalization, operability of such electronic device.

The invention claimed is:

1. A pressure detection unit comprising:
    a first substrate and a second substrate which are disposed in opposition to each other and subject to load from the outside;
    a first electrode provided on the first substrate and a second electrode provided on the second substrate, and electrically conductive pressure-sensitive ink disposed between the first electrode and the second electrode and having electrical characteristics which varies according to the load; and
    a load transmission member disposed between the first substrate and the first electrode or between the second substrate and the second electrode, the load transmission member transmitting the load to the pressure-sensitive ink in a concentrated manner.

2. A pressure detection unit according to claim 1, wherein thickness of the first substrate and thickness of the second substrate are rendered different from each other.

3. A pressure detection unit according to claim 2, wherein the load transmission member is disposed between the thinner one of the first substrate and the second substrate and the corresponding electrode.

4. A pressure detection unit according to claim 1, wherein the load transmission member is provided between the first substrate and the first electrode and between the second substrate and the second electrode.

5. A pressure detection unit according to claim 1, wherein the load transmission member is formed with a cross sectional area progressively increasing as it extends away from an inner face of the first substrate or the second substrate.

6. A pressure detection unit according to claim 1, wherein the pressure-sensitive ink is provided in the form of dots along a peripheral edge portion of the first substrate or the second substrate.

7. A pressure detection unit according to claim 1, wherein the pressure-sensitive ink is disposed so as to cover at least one of the pair of electrodes.

8. A pressure detection unit according to claim 1, wherein the pressure detection unit further comprises an adhesion member disposed in an opposing area of the first substrate and the second substrate and having adhesiveness for adhering the first substrate and the second substrate to each other, with the first and second electrodes and the pressure-sensitive ink being in contact with each other; and
    wherein, the adhesion member draws the first substrate and the second substrate to each other to apply an initial load to the pressure-sensitive ink.

9. A pressure detection unit according to claim 1, wherein the first substrate and the second substrate are fused to each other with the first and second electrodes and the pressure-sensitive ink being in contact with each other to draw the first substrate and the second substrate to each other to apply an initial load to the pressure-sensitive ink.

10. A pressure detection unit according to claim 1, wherein the load transmission member is formed of cured heat-curable resin or cured UV-curable resin.

11. A pressure detection unit according to claim 1 used for a touch input device.

12. A pressure detection unit comprising:
a first substrate and a second substrate which are disposed in opposition to each other and subject to load from the outside;
a pair of electrodes provided on one of the first substrate and the second substrate,
electrically conductive pressure-sensitive ink disposed on the other of the first substrate and the second substrate to cover the pair of electrodes and having electrical characteristics which varies according to the load; and
a load transmission member disposed between the substrate on which the pressure-sensitive ink is disposed and the pressure-sensitive ink, the load transmission member transmitting the load to the pressure-sensitive ink in a concentrated manner.

13. A pressure detection unit according to claim 12, wherein the load transmission member is formed with a cross sectional area progressively increasing as it extends away from an inner face of the first substrate or the second substrate.

14. A pressure detection unit according to claim 12, wherein the load transmission member is formed of cured heat-curable resin or cured UV-curable resin.

15. A pressure detection unit according to claim 12 used for a touch input device.

\* \* \* \* \*